United States Patent
Ooga et al.

(10) Patent No.: US 7,704,640 B2
(45) Date of Patent: Apr. 27, 2010

(54) NON-AQUEOUS ELECTROLYTE SECONDARY CELL

(75) Inventors: Keisuke Ooga, Tokushima (JP); Masato Iwanaga, Tokushima (JP); Hideyuki Inomata, Naruto (JP); Ryuji Ohshita, Tokushima (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1096 days.

(21) Appl. No.: 11/362,225

(22) Filed: Feb. 27, 2006

(65) Prior Publication Data

US 2006/0194111 A1  Aug. 31, 2006

(30) Foreign Application Priority Data

Feb. 28, 2005  (JP)  ............................. 2005-054381

(51) Int. Cl.
*H01M 4/58*  (2006.01)
(52) U.S. Cl. .............. 429/231.3; 429/231.1; 429/231.6; 429/330; 429/331; 429/332
(58) Field of Classification Search .............. 429/231.3, 429/231.1, 231.6, 330, 331, 332
See application file for complete search history.

(56) References Cited

U.S. PATENT DOCUMENTS

| 7,435,510 | B2 * | 10/2008 | Tode et al. ............... 429/231.3 |
| 2005/0053838 | A1 * | 3/2005 | Ogasawara et al. ...... 429/231.3 |
| 2006/0105240 | A1 * | 5/2006 | Kinoshita et al. ........ 429/231.3 |

FOREIGN PATENT DOCUMENTS

| JP | 8-64237 | 3/1996 |
| JP | 9-97626 | 4/1997 |
| JP | 2000-12025 | 1/2000 |
| JP | 2000-138063 | 5/2000 |
| JP | 2000-164250 | 6/2000 |
| JP | 2001-68167 | 3/2001 |
| JP | 2001-307774 | 11/2001 |
| JP | 2002-231307 | 8/2002 |
| JP | 2002-334718 | 11/2002 |
| JP | 2004-200101 | 7/2004 |
| JP | 2005-149959 | * 6/2005 |

* cited by examiner

*Primary Examiner*—Laura S Weiner
(74) *Attorney, Agent, or Firm*—Westerman, Hattori, Daniels & Adrian, LLP

(57) ABSTRACT

A non-aqueous electrolyte secondary cell excellent in cycle characteristics is provided. This purpose is achieved by the following structure. A non-aqueous electrolyte secondary cell has a positive electrode having a positive electrode active material, a negative electrode having a negative electrode active material, and a non-aqueous electrolyte having a non-aqueous solvent and an electrolytic salt. The positive electrode active material has a lithium-cobalt compound oxide having added therein at least zirconium. The non-aqueous electrolyte has $LiBF_4$ at from 0.05 to 1.0 mass % of a total mass of the non-aqueous electrolyte and unsaturated cyclic carbonate at from 1.0 to 4.0 mass %. The true density ratio of the positive electrode is 0.72 or greater, the true density ratio being represented by formula 1 shown below: (Formula 1) True density ratio=active material apparent density of electrode active material layer÷true density of active material.

3 Claims, No Drawings

નon-AQUEOUS ELECTROLYTE SECONDARY CELL

BACKGROUND OF THE INVENTION

1) Field of the Invention

The present invention relates to an improvement of non-aqueous electrolyte secondary cells, which improvement is intended to improve cycle characteristics.

2) Description of the Related Art

Today, mobile information terminals such as mobile phones, notebook personal computers, PDAs, and the like are widespread. As the driving sources for them, non-aqueous electrolyte secondary cells, which have high energy density and high capacity, are widely used.

In recent years, the positive electrode active material is filled at high density in an attempt to increase the capacity of cells. However, if the positive electrode active material is pressed with high pressure for the purpose of high-density filling, the active material particles are cracked and there appear on each surface coarse active portions, and because the active portions are easy to react with the electrolytic solution, the electrolytic solution is decomposed, resulting in generation of gas. Because of this, there have been such problems that the cell expands, and that cycle deterioration occurs resulting from a reduction in the amount of the electrolytic solution.

Techniques related to non-aqueous electrolyte secondary cells are proposed in patent documents 1 to 8.

These documents are summarized as follows.

Patent Document 1: Japanese Patent Application Publication No. 2000-12025 (Abstract, claims).

Patent Document 2: Japanese Patent Application Publication No. 2000-138063 (Abstract, claims).

Patent Document 3: Japanese Patent Application Publication No. 2000-164250 (Abstract, claims).

Patent Document 4: Japanese Patent Application Publication No. 2001-307774 (Abstract, claims).

Patent Document 5: Japanese Patent Application Publication No. 2002-231307 (Abstract, claims).

Patent Document 6: Japanese Patent Application Publication No. 2002-334718 (Abstract, claims).

Patent Document 7: Japanese Patent Application Publication No. 8-64237 (Abstract, claims).

Patent Document 8: Japanese Patent Application Publication No. 9-97626 (Abstract, claims).

The techniques involved in patent documents 1-3 are those using, as the positive electrode active materials, lithium-manganese-based oxides of spinel structure, and $LiBF_4$. It is said that with these techniques, Mn is prevented from being decomposed from the crystal structure of the positive electrode active material, and stability at the time of operation and preservation is improved.

However, lithium-manganese-based oxides of spinel structure are problematic in that the amount of the lithium that contributes to charging and discharging is small, and thus the cell capacity is reduced and the decomposition of the electrolytic solution cannot be prevented when a highly-densely-filled positive electrode is used.

Patent document 4 is a technique that uses an electrolytic solution that contains $LiPF_6$ and $LiBF_4$, and it is said that with this technique, such a cell is obtained that is excellent in stability at the time of overcharging.

Patent document 5 is a technique that uses an electrolytic solution that contains $LiBF_4$ and whose HF density is from 30-1000 ppm, and it is said that with this technique, expansion and capacity reduction encountered when the cell is preserved in the high temperature environment and in the terminal charging state are prevented.

Patent document 6 is a technique that uses an electrolytic solution that contains $LiBF_4$ at from 30-1000 ppm, and it is said that with this technique, expansion and capacity reduction encountered when the cell is preserved under the high temperature environment and in the terminal charging state are prevented.

Patent document 7 is a technique that uses an electrolytic solution that contains $LiPF_6$ and $LiBF_4$, and it is said that with this technique, self-charging encountered when the cell is preserved in the charged state is prevented.

Patent document 8 is a technique that uses an electrolytic solution that contains $LiBF_4$, and it is said that with this technique, preferable discharging characteristics are obtained under the condition of large current, and stable cell performance is obtained under the high temperature environment and under the low temperature environment.

However, the techniques involved in patent documents 4-8 are problematic in that the decomposition of the electrolytic solution cannot be prevented when a highly-densely-filled positive electrode is used.

SUMMARY OF THE INVENTION

In view of the foregoing and other problems, it is an object of the present invention to provide a non-aqueous electrolyte secondary cell that has high capacity and excels in cycle characteristics.

In order to accomplish the above and other objects, the present invention is configured as follows.

A non-aqueous electrolyte secondary cell comprising: a positive electrode having a positive electrode active material; a negative electrode having a negative electrode active material; and a non-aqueous electrolyte having a non-aqueous solvent and an electrolytic salt, wherein the positive electrode active material has a lithium-cobalt compound oxide having added therein at least zirconium; the non-aqueous electrolyte has $LiBF_4$ at from 0.05 to 1.0 mass % of a total mass of the non-aqueous electrolyte and unsaturated cyclic carbonate at from 1.0 to 4.0 mass %; and a true density ratio of the positive electrode is 0.72 or greater, the true density ratio being represented by formula 1 shown below:

True density ratio=active material apparent density of electrode active material layer÷true density of active material. (Formula 1)

With the above structure, the $LiBF_4$ is decomposed on the electrode surfaces, especially on the surface of the active portion of the positive electrode, and a coating film resulting from LiF and B is formed. This coating film prevents the decomposition reaction of the electrolytic solution, and as a result, causes the effect of increased cycle characteristics.

Also, the unsaturated cyclic carbonate, such as vinylene carbonate (VC), is decomposed on the electrode plate surfaces and a coating film is formed. This coating film also prevents the decomposition reaction of the electrolytic solution. This further enhances cycle characteristics.

If zirconium is added in the lithium cobaltate, the stability of the active material is enhanced, and the decomposition of the electrolytic solution is prevented, resulting in further improved cycle characteristics. Thus, by using these three substances, such a cell is realized that is excellent in cycle characteristics.

The effect of improving cycle characteristics is enhanced especially when the filling density of the positive electrode is high such that the true density ratio of the positive electrode is 0.72 or greater. In the case where the true density ratio of the positive electrode is low, cycle deterioration is hard to occur without employing the above structure. However, in this case, a low true density ratio is not preferable because a reduction in the amount of the active material makes discharging capacity small.

In addition, if a large amount of $LiBF_4$ is contained, the coating film resulting from the $LiBF_4$ becomes dense, and thus the acceptance ability of the lithium is decreased, and also, the coating film itself is decomposed to generate gas, resulting in expansion of the cell. On the other hand, if the amount of addition is excessively small, the coating film resulting from the $LiBF_4$ becomes scarce, and thus the decomposition prevention effect of the electrolytic solution is not sufficient. In view of this, the amount of addition of $LiBF_4$ is preferably from 0.05 to 1.0 mass %.

If the amount of addition of the unsaturated cyclic carbonate is excessively small, sufficient effects cannot be obtained, and if the amount is excessively large, it is feared that decomposition occurs at the time of high-temperature preservation and gas is generated, causing cell expansion. In view of this, the amount of addition of the unsaturated cyclic carbonate is preferably from 1.0 to 4.0 mass %. It should be noted that the amount of addition of the $LiBF_4$ and unsaturated cyclic carbonate refers to the ratio of them to the total amount of the non-aqueous electrolyte including the additives and the like.

If the amount of addition of the zirconium is excessively small, sufficient effects cannot be obtained, and if the amount is excessively large, further more effects cannot be obtained and the cost is increased at the same time. In view of this, the amount of addition (the number of moles) of the zirconium is preferably from 0.1 to 1.0% of the number of moles of the cobalt.

In addition, if magnesium is contained in the lithium-cobalt compound oxide, the stability of the positive electrode active material is further enhanced.

With the present invention, the cycle characteristics of a cell in which the active material is filled at high density and that has high capacity are drastically enhanced.

DESCRIPTION OF THE PREFERRED EMBODIMENTS

Preferred embodiments of the present invention will be described below. It will be appreciated that the present invention will not be limited to the examples below, and that any practice of the invention with suitable amendments is possible without departing from the scope of the invention.

EXAMPLE 1

<Preparation of the Positive Electrode>

In powder $LiCoO_2$, Zr and Mg were added each at 0.2 mol % of the cobalt. The resultant product was then sintered, and thus a positive electrode active material made of a lithium-cobalt compound oxide containing Zr and Mg was obtained.

Eighty-five point five parts by mass of the positive electrode active material, 9.5 parts by mass of carbon powder as a conductive agent, 5 parts by mass of polyvinylidene fluoride (Pods) as a binder, and N-methyl-pyrrolidone were mixed, thus obtaining a positive electrode active material slurry. This positive electrode active material slurry was applied on both surfaces of a positive electrode current collector (15 μm thick) made of aluminum, dried, and compressed with a roller such that the true density ratio would be 0.72, thus preparing a positive electrode.

Here the true density ratio of the positive electrode is represented by the following formula 1.

True density ratio=active material apparent density of electrode active material layer÷true density of active material. (Formula 1)

The active material apparent density of the electrode active material layer refers to the mass of the active material contained in a unit volume of the layer made of an active material mixture that contains, as well as the active material main body, a conductive agent, binder, thickener, void, and the like, and is represented by formula 2 shown below. The true density of the active material refers to the substantial density of the active material with the void emitted. The true density is generally measured by the liquid phase substitution method (the pycnometer method) and the like. If the electrode core body (current collector) is made of porous metal, formula 3 shown below can be used.

Active material apparent density of electrode active material layer=mass of active material layer× mass mixture ratio of active material÷active material layer volume. (Formula 2)

True density of active material=(electrode total mass− porous metal density×(1−porosity rate of porous metal))×mass mixture ratio of active material÷ (electrode total volume−porous metal mass÷porous metal density). (Formula 3)

<Preparation of the Negative Electrode>

Ninety five parts by mass of graphite as a negative electrode active material, 3 parts by mass of carboxy methyl cellulose as a thickening agent, 2 parts by mass of styrene butadiene rubber as a binder, and water were mixed together, thus obtaining negative electrode active material slurry. This negative electrode active material slurry was applied on both surfaces of a negative electrode current collector (8 μm thick) made of copper, dried, and rolled, thus preparing a negative electrode.

<Preparation of Electrode Assembly>

An electrode assembly was prepared by winding. The positive electrode and the negative electrode were wound with in between a separator made of a microporous film of polypropylene, and then pressed, thus preparing a flat wound electrode assembly.

<Preparation of the Non-Aqueous Electrolyte>

As a non-aqueous solvent, ethylene carbonate (EC), diethyl carbonate (DEC), and methyl ethyl carbonate (MEC) were mixed at a volume ratio of 30:20:50 (25° C. and 1 atm.). As electrolytic salt, $LiPF_6$ was dissolved in the non-aqueous solvent at 1 M (mole/liter). Added therein were vinylene carbonate (VC) at 3.0 mass % and $LiBF_4$ at 1.0 mass %. Further added therein were cyclohexylbenzene (CHB) at 1.0 mass % and tert-butylbenzene at 1.5 mass %. Thus, an electrolytic solution (non-aqueous electrolyte) was obtained.

<Assembly of the Cell>

After the above electrode body was inserted in a 0.2 mm-thick outer casing made of an aluminum alloy, the above electrolytic solution was inserted, and the opening portion of the outer casing was sealed. Thus, a non-aqueous electrolyte secondary cell (34 mm wide×50 mm high×5.5 mm thick) with a nominal capacity of 990 mAh was prepared.

(Cells A1-A6, Cells X1-X6)

Cells A1-A6 were prepared in the same manner as the above example except that the true density ratio of the positive electrode was varied between 0.68 and 0.78. Cells X1-X6 were prepared in the same manner as cells A1-A6 except that $LiBF_4$ was not added.

Each of the above-prepared cells was subjected to a cycle characteristics test under the following conditions. The amount of increase in the thickness of each cell after the cycle characteristics test was measured. The results are shown in Table 1.

<Cycle Characteristics Test>

Charge conditions: a constant current of 1 I t (990 mA); constant voltage (4.2 V); 3 hours in total; and 25° C.

Discharge conditions: a constant current of 1 I t; an ending voltage of 2.75 V; and 25° C.

Cycle characteristics (%):(500th-cycle discharge capacity/ 1st-cycle discharge capacity)×100.

TABLE 1

| Positive electrode true density ratio | Cycle characteristics (%) | | Amount of cycle expansion (mm) | |
|---|---|---|---|---|
| | No LiBF$_4$ added | LiBF$_4$ added | No LiBF$_4$ added | LiBF$_4$ added |
| X1:A1 | 0.68 | 85 | 85 | 0.37 | 0.38 |
| X2:A2 | 0.7 | 82 | 83 | 0.41 | 0.42 |
| X3:A3 | 0.72 | 78 | 83 | 0.52 | 0.47 |
| X4:A4 | 0.74 | 76 | 82 | 0.66 | 0.5 |
| X5:A5 | 0.76 | 74 | 81 | 0.81 | 0.51 |
| X6:A6 | 0.78 | 70 | 79 | 0.92 | 0.55 |

It can be seen from Table 1 that as the true density ratio becomes greater, cycle deterioration occurs both in cells A and cells X, and thus the amount of cycle expansion tends to increase, but the extent of expansion is smaller in cells A, in which LiBF$_4$ is contained, than in cells X, in which LiBF$_4$ is not contained.

This can be considered as follows. In cells A, LiBF$_4$ is added, and a coating film resulting from LiF and B, which are the decomposition products of the LiBF$_4$, is formed satisfactorily. Since this coating film prevents the decomposition of the electrolytic solution, cycle deterioration is reduced and cycle expansion caused by gas generated by decomposition of the electrolytic solution is reduced.

On the other hand, in cells X, in which LiBF$_4$ is not added, the decomposition prevention effect of the electrolytic solution realized by the LiBF$_4$ cannot be obtained, and thus cycle deterioration and cycle expansion are increased. This adverse effect increases especially when the filling density of the positive electrode becomes high such that the true density ratio of the positive electrode is 0.72 or greater, because the electrolytic solution is easy to be decomposed at active portions resulting from cracking of the active material at the time of pressing. When the true density ratio is 0.72 or greater, the effects realized by the LiBF$_4$ are increased such that the difference of cycle characteristics between cells A and cells X is from 5 to 9%, and the difference of the amount of cycle expansion is from 0.16 to 0.37 mm.

(Cells B1-B6, cells Y1-Y6)

Cells B1-B6 each with a positive electrode true density ratio of 0.72 were prepared in the same manner as the above example except that the amount of addition of zirconium was from 0.0 to 2.0% of the cobalt. Cells Y1-Y6 were prepared in the same manner as cells B1-B6 except that LiBF$_4$ was not added.

Each of the above-prepared cells was subjected to a cycle characteristics test under the above-listed conditions. The amount of increase in the thickness of each cell after the cycle characteristics test was measured. The results are shown in Table 2.

TABLE 2

| Amount of addition of zirconium | Cycle characteristics (%) | | Amount of cycle expansion (mm) | |
|---|---|---|---|---|
| | No LiBF$_4$ added | LiBF$_4$ added | No LiBF$_4$ added | LiBF$_4$ added |
| Y1:B1 | 0 | 62 | 61 | 0.56 | 0.48 |
| Y2:B2 | 0.1 | 67 | 73 | 0.71 | 0.50 |
| Y3:B3 | 0.2 | 74 | 81 | 0.81 | 0.51 |
| Y4:B4 | 0.8 | 78 | 84 | 0.84 | 0.55 |
| Y5:B5 | 1.0 | 80 | 86 | 0.85 | 0.56 |
| Y6:B6 | 2.0 | 79 | 85 | 0.84 | 0.55 |

It can be seen from Table 2 that within the range from 0 to 1.0% for the amount of addition of zirconium, as the amount of addition of Zr increases, cycle characteristics improve both in cells B and Y, and thus the amount of cycle expansion tends to increase, but the extent of expansion is smaller in cells B, in which LiBF$_4$ is contained, than in cells Y, in which LiBF$_4$ is not contained. On the other hand, it can be seen that if the amount of addition of Zr 1.0% or higher, there is substantially no change in cycle characteristics and amount of cycle expansion.

This can be considered as follows. If Zr is added in the active material, the stability thereof is enhanced, thereby enhancing cycle characteristics. This becomes more effective with the coexistence of LiBF$_4$. Thus, cells B have smaller cycle characteristics than cells Y, resulting in a further smaller amount of cycle expansion.

On the other hand, if the amount of addition of Zr exceeds 1.0 mole %, the above effect reaches its maximum. If the amount of Zr is excessively large, an increase in cost is caused, and therefore, the amount of addition is preferably from 0.1 to 1.0 mole %.

(Cells C1-C9)

Cells C1-C9 each with a positive electrode true density ratio of 0.72 were prepared in the same manner as the above example except that the amount of addition of LiBF$_4$ was varied between 0.0 and 1.5 mass %.

Each of the above-prepared cells was subjected to a cycle characteristics test under the above-listed conditions. The amount of increase in the thickness of each cell after the cycle characteristics test was measured. The results are shown in Table 3.

TABLE 3

| | Amount of addition of LiBF$_4$ (mass %) | Cycle Characteristics (%) | Amount of expansion (mm) |
|---|---|---|---|
| C1 | 0 | 74 | 0.81 |
| C2 | 0.03 | 75 | 0.80 |
| C3 | 0.05 | 77 | 0.66 |
| C4 | 0.07 | 79 | 0.60 |
| C5 | 0.1 | 81 | 0.51 |
| C6 | 0.5 | 83 | 0.48 |
| C7 | 1.0 | 85 | 0.47 |
| C8 | 1.3 | 83 | 0.63 |
| C9 | 1.5 | 84 | 0.70 |

It can be seen from Table 3 that within the range from 0 to 1.0% for LiBF$_4$, as the amount of addition of LiBF$_4$ increases, cycle characteristics improve, and thus the amount of cycle expansion tends to decrease. On the other hand, it can be seen that if the amount of addition of $LiBF_4$ is 1.0% or higher, cycle characteristics do not change, but contrarily, the amount of expansion increases.

This can be considered as follows. If the amount of addition of $LiBF_4$ is excessively large, the decomposed product coating film thereof becomes dense, and because of decomposition of the coating film itself, the coating film structure is collapsed, and thus a decomposition reaction of the electrolytic solution occurs, resulting in an increase in the amount of cycle expansion. If the amount of addition is excessively small, the coating film becomes scarce, and thus the decomposition prevention effect of the electrolytic solution cannot be obtained sufficiently. Also, because of the decomposition of the electrolytic solution, the amount of cycle expansion increases. In view of this, the amount of addition of $LiBF_4$ is preferably from 0.05 to 1.0 mass %.

(Cells D1-D6, cells Z1-Z6)

Cells D1-D6 each with a positive electrode true density ratio of 0.72 were prepared in the same manner as the above example except that the amount of addition of vinylene carbonate (VC) was from 0 to 5.0% of the cobalt. Cells Z1-Z6 were prepared in the same manner as cells D1-D6 except that $LiBF_4$ was not added.

Each of the above-prepared cells was subjected to a cycle characteristics test under the above-listed conditions. The amount of increase in the thickness of each cell after a high-temperature charging preservation test was measured. The results are shown in Table 4.

<High-Temperature Charging Preservation Test>

Charge conditions: a constant current of 1 I t (990 mA); constant voltage (4.2 V); 3 hours in total; and 25° C.

Preservation conditions: 60° C. and 20 days.

TABLE 4

| Amount of addition of VC (mass %) | Cycle characteristics (%) | | Amount of high temp. expansion (mm) | |
|---|---|---|---|---|
| | No $LiBF_4$ added | $LiBF_4$ added | No $LiBF_4$ added | $LiBF_4$ added |
| Z1:D1  0 | 68 | 69 | 0.09 | 0.13 |
| Z2:D2  1 | 70 | 72 | 0.12 | 0.17 |
| Z3:D3  2 | 73 | 78 | 0.15 | 0.21 |
| Z4:D4  3 | 74 | 81 | 0.22 | 0.26 |
| Z5:D5  4 | 78 | 85 | 0.34 | 0.38 |
| Z6:D6  5 | 80 | 87 | 0.48 | 0.51 |

It can be seen from Table 4 that as the amount of addition of VC increases, there is a tendency that improves cycle characteristics and increases amount of expansion after the high-temperature charging preservation test, but cells D, in which $LiBF_4$ is added, have greater cycle characteristics than cells Z, in which $LiBF_4$ is not added.

This can be considered as follows. The vinylene carbonate (VC) reacts with the electrode to form a stable coating film, and by preventing the electrolytic solution from being decomposed, the coating film enhances cycle characteristics, but the coating film is problematic in that at the time of high-temperature preservation, the remaining VC after formation of the coating film is decomposed to generate gas. If $LiBF_4$ is added, the coating film resulting therefrom prevents the decomposition of the remaining VC, and thus, cells D have greater cycle characteristics than cells Z. If the amount of addition of VC is excessively large, because of the gas after the high temperature leaving, cell expansion becomes large. If the amount of addition of VC is excessively small, the effect of improving cycle characteristics cannot be obtained sufficiently, and therefore, the amount of addition of VC is preferably from 1.0 to 4.0 mass %.

(Additional Remarks)

As the non-aqueous solvent, other than what is specified in the above examples, propylene carbonate, γ-butyrolactone, dimethyl carbonate, tetrahydrofuran, 1,2-dimethoxyethane, 1,3-dioxolane, 2-methoxy tetrahydrofuran, diethylether, and the like can be used.

As the unsaturated cyclic carbonate, other than vinylene carbonate, methylvinylene carbonate, ethylvinylene carbonate, and the like can be used.

As the electrolytic salt, other than the above-mentioned $LiPF_6$, one of $LiN(C_2F_5SO_2)_2$, $LiN(CF_3SO_2)_2$, $LiClO_4$, or a mixture of a plurality kinds of the foregoing can be used.

While in the examples above lithium cobaltate in which Zr is added is used alone as the positive electrode active material, a mixture of the lithium cobaltate and lithium cobaltate with no Zr added, lithium nickelate, lithium manganate, or the like can be used. In this case, the Zr-added lithium cobaltate is used preferably at 50 mass % or greater of the total mass of the positive electrode active material, more preferably at 70 mass % or greater, and further more preferably at 90 mass % or greater. Also, in the lithium cobaltate, metal other than Zr can be added such as Mg and Al.

As has been described hereinbefore, with the present invention, the effect of providing such a non-aqueous electrolyte secondary cell is realized that in a non-aqueous electrolyte secondary cell with high filling density such that the true density ratio is 0.72 or greater, the decomposition of the electrolytic solution is prevented resulting in high capacitance and excellent cycle characteristics. Therefore, industrial applicability is considerable.

What is claimed is:

1. A non-aqueous electrolyte secondary cell comprising:
   a positive electrode having a positive electrode active material;
   a negative electrode having a negative electrode active material; and
   a non-aqueous,
   wherein the positive electrode active material has a lithium-cobalt compound oxide having added therein at least zirconium;
   the non-aqueous electrolyte has a non-aqueous solvent, $LiBF_4$ and electrolytic salt being at least one selected from the group consisting of $LiPF_6$, $LiN(C_2F_5SO_2)_2$, $LiN(CF_3SO_2)_2$, and $LiClO_4$, and an unsaturated cyclic carbonate which is a vinylene carbonate;
   the content of the $LiBF_4$ is from 0.05 to 1.0 mass % of a total mass of the non-aqueous electrolyte;
   the content of the vinylene carbonate is from 1.0 to 4.0 mass % of a total mass of the non-aqueous electrolyte; and
   a true density ratio of the positive electrode is 0.72 or greater, the true density ratio being represented by formula 1 shown below:

True density ratio=active material apparent density of electrode active material layer÷true density of active material.  (Formula 1)

2. The non-aqueous electrolyte secondary cell according to claim 1, wherein the number of moles of the zirconium contained in the lithium-cobalt compound oxide is from 0.1 to 1.0% of the number of moles of the cobalt.

3. The non-aqueous electrolyte secondary cell according to claim 1, wherein the lithium-cobalt compound oxide further comprises magnesium.

* * * * *